United States Patent

[11] 3,612,374

[72] Inventor Kenneth B. Shartzer
2416 Randolph Road, Janesville, Wis. 53545
[21] Appl. No. 856,767
[22] Filed Sept. 10, 1969
[45] Patented Oct. 12, 1971

[54] PIPE PULLING DEVICE
7 Claims, 14 Drawing Figs.
[52] U.S. Cl. .................................................. 226/172
[51] Int. Cl. .............................................. B65h 29/12
[50] Field of Search .......................................... 226/172, 188, 184

[56] References Cited
UNITED STATES PATENTS
2,884,120   4/1959   Bruestle ...................... 226/184 X
2,935,178   5/1960   Lutcke ........................ 226/172
3,022,928   2/1962   Ulmitz ........................ 226/172

Primary Examiner—Allen N. Knowles
Attorney—Dirk J. Veneman

ABSTRACT: A device for pulling elongate articles such as pipe through a processing machine. The device comprises a plurality of caterpillarlike traction members which engage the pipe periphery and exert a pulling force thereon. The traction members are self-centering and can accommodate various pipe diameters.

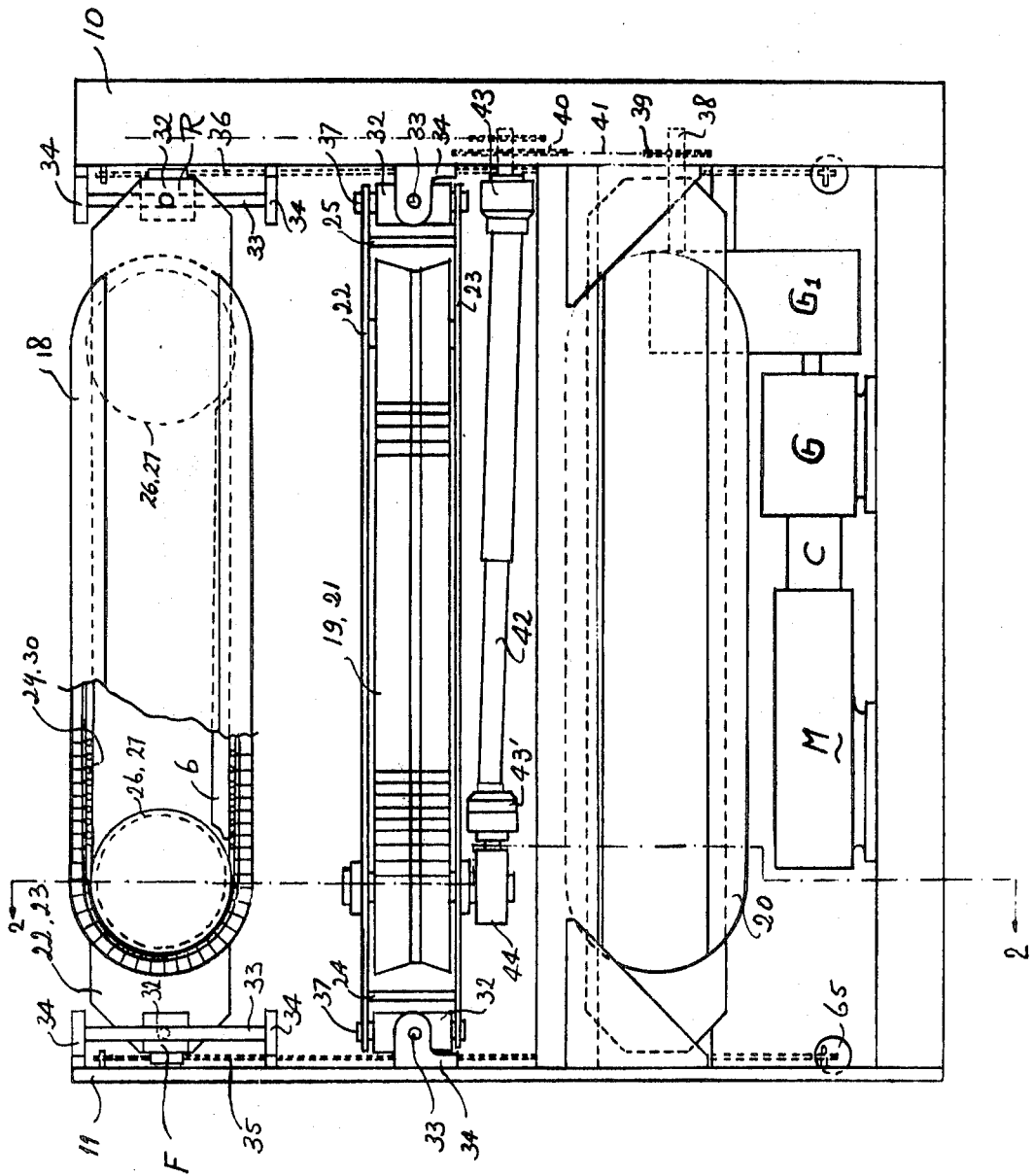

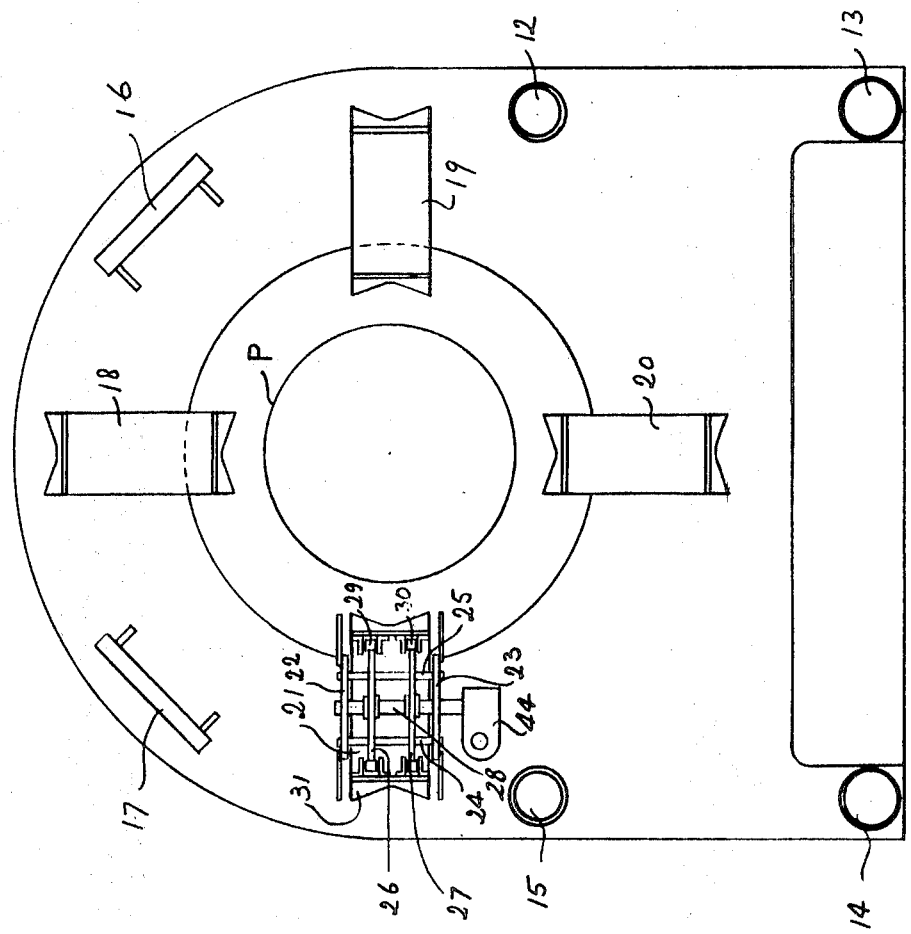
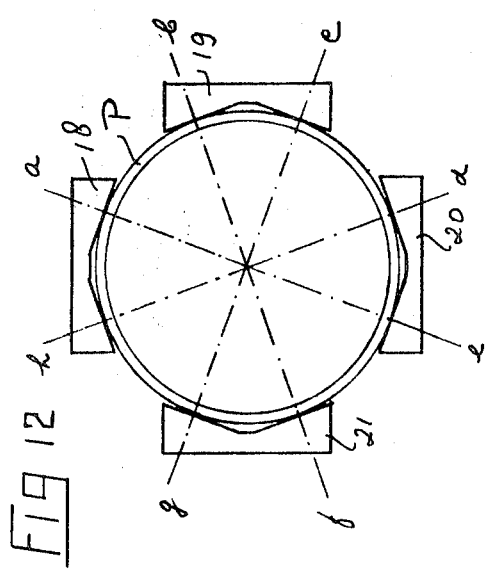
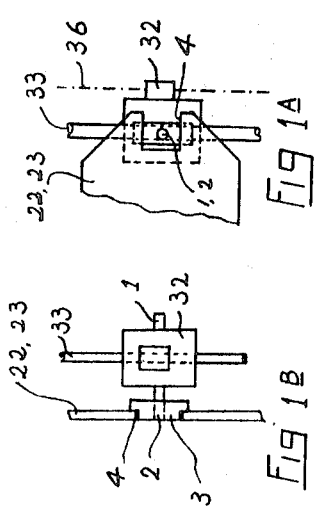

PIPE PULLING DEVICE

This invention relates to the art of plastic or rubber pipe extrusion and more particularly the invention relates to a device for pulling pipe extruded from the extruder head through a sizing die.

The invention is equally applicable to the art of manufacturing rubber hoses or to any operation wherein a pulling force is to be exerted on a generally cylindrically shaped elongate object, such as for example flexible cable or metal pipes.

Considerable force is required to pull plastic extruded pipe through the pipe sizing die and it has been known to use a device which includes a pair of rubber tires contacting the plastic pipe at 180° opposed points around the pipe periphery in order to exert a pulling force on the pipe as it leaves the pipe sizing die.

A distinct disadvantage with equipment of this type is that it exerts considerable inward pressure on the pipe periphery and often causes the still warm and flexible pipe to collapse. As production speeds and pipe diameters increase the need for larger pulling forces on the plastic pipe has become evident and prior art machines art not able to meet the demands for the additional pulling force requirement mainly because of the manner in which they are designed which did not permit an increase in radial force exerted on the pipe periphery which force is essential in order to obtain the additional increase in pulling force.

The machine of the present invention is designed to grip the extruded pipe around its periphery at a plurality of tangent points which extend for a considerable portion of the pipe length. In this manner the inward pressure on the pipe is equally distributed around its periphery and is applied over a considerable portion of the pipe length being processed thereby resulting in relatively low unit forces and yet obtaining a substantial increase in total pulling force on the pipe which is extruded.

The machine of the present invention is also designed to accommodate a large number of pipe diameters so that it may be used for a large variety of operations.

It is accordingly an important object of the present invention to provide a pipe pulling machine which employs a multiplicity of equally spaced contact points around the periphery of the pipe and each contact point extending for a substantial portion of the pipe length.

Another object of the present invention is to provide a pipe pulling machine which is automatically adjustable to various pipe sizes or diameters while yet maintaining its basic centerline at the same elevation.

Another object of the present invention is to provide a pipe pulling machine, the operating speed of which is infinitely variable and which exerts a constant torque over the full range of the operating speed.

A further object of the present invention is to provide a pipe pulling machine in which the contact pressure between the pulling members and the pipe is adjustable over a wide range.

These and other objects will become more apparent from time to time as this specification proceeds.

BRIEF DESCRIPTION OF THE DRAWINGS

FIG. 1 is a front elevational, part sectional view of the pipe pulling machine of the present invention;

FIG. 1a is a detailed view of part of the structure shown in FIG. 1;

FIG. 1b is a side view of the structure shown in FIG. 1a;

FIG. 2 is a cross-sectional view taken substantially along the lines 2—2 of FIG. 1;

FIG. 12 is a diagrammatic representation of the manner in which pulling pressure is applied around the periphery of a pipe.

Referring now to FIGS. 1 and 2, it will be seen that the device of the present invention comprises upright frame members 10 and 11 which are spaced apart a predetermined distance by means of spacer pipes 12, 13, 14 and 15 and by spacer channels 16 and 17. The upright member 10 is in the form of a gearcase and contains the driving mechanism which will be described in detail hereinbelow.

Figure 4:
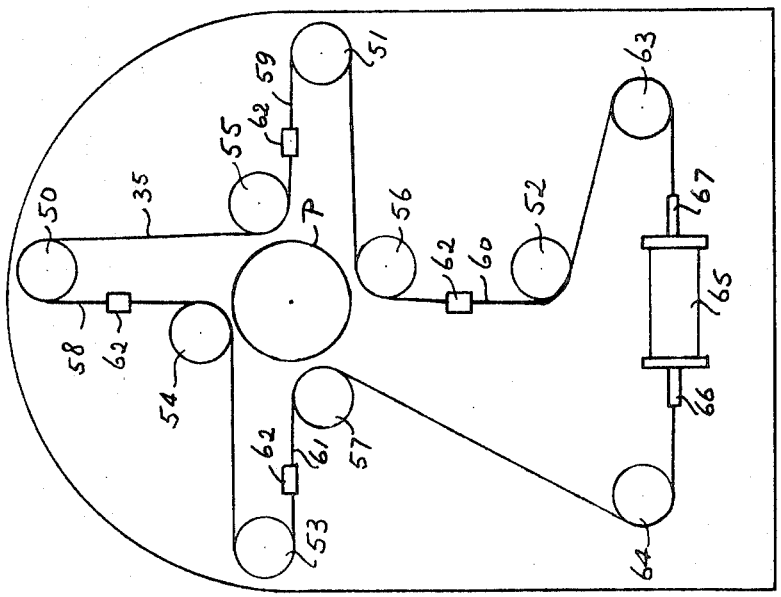
FIG. 4 is a diagrammatic view showing the manner in which the pipe pulling elements are adjustable to accommodate various pipe diameters.

Mounted between the upright frame members 10 and 11 are pipe pulling elements or pipe traction assemblies 18, 19, 20 and 21. The pipe pulling elements 18 through 21 are spaced around the periphery of a pipe P at 90° intervals. Each of the pipe pulling elements 18 through 21 comprises essentially a pair of elongate members 22 and 23 spaced apart by suitable spacers such as 24 and 25. Mounted at each end of and between the plates 22 and 23 are a pair of sprocket wheels 26 and 27. The sprocket wheels 26 and 27 are mounted for rotation between the plates 21 and 22 by means of a central shaft 28. Each of the sprocket wheels 26 and 27 carries a chain 29 and 30. Molded rubber traction blocks 31 are mounted to each pair of chains 29 and 30 in a manner which will be described in detail hereinbelow. A backup bar 6 is mounted opposite the chain section of the chain 29, 30 which is in contact with the pipe being processed.

At either end between each of the plates 22 and 23 of each of the pipe traction assemblies 18 through 21 is mounted a slide block 32. Each of the slide blocks 32 is slidably mounted onto a shaft 33. Each of the shafts 33 is mounted into the front and rear upright frame members 10 and 11 by means of mounting brackets 34. It will thus be seen that each of the pipe traction assemblies 18 through 21 is mounted for up and down movement between their respective mounting brackets 34. The slide blocks 32 associated with the upright frame member 11 are suitably attached to a chain 35 and the slide blocks 32 associated with the upright frame member 10 are suitably attached to a chain 36. By activating either of the chains 35 or 36 the front portion F or rear portion R of each of the pipe traction assemblies can be raised or lowered to any desired position between the mounting brackets 34. The chains 35 and 36 are operated in such a manner that all of the front portions or rear portions of each of the pipe traction assemblies move simultaneously towards or away from the pipe P. It should also be noted at this point that each of the chain traction assemblies 18 through 21 are pivotally mounted to the slide blocks 32 by means of pivot pins 37 so that the front or rear portions of the pipe traction assemblies may be moved individually. This is shown in detail in FIGS. 1a and 1b from which it will be seen that the traction member 22, 23 is mounted for sliding up and down movement on shaft 33 by means of slide block 32 to which chain 36 is attached. The slide block 32 has two journals 1 and 2 attached to either end thereof by means of which the entire traction assembly 22, 23 is pivotally mounted with respect to shaft 33. Each of the journals 1 and 2 is mounted in a slide block 3. The slide block 3 is mounted in a slot 4 in sideplate 5 of the traction assembly 22, 23. In this manner the increase in distance between front and rear mountings F and R can be compensated for when, for example, the front portion F is in its upper position and the rear portion R is in its lower position. The slide blocks 3 will slide in and out of the sideplates of the traction assembly 22, 23.

Each of the pipe traction assemblies 18 through 21 are driven by a solid-state electronic controlled DC shunt wound motor M. The motor M is connected to a variable speed gearbox G by means of a coupling C. By means of a further gear reducing unit G-1, driving power is supplied to drive shaft 38. Drive shaft has a sprocket 39 mounted thereto which drives a sprocket 40 by means of drive chain 41. The sprocket 40 is connected to a telescoping shaft assembly 42 by means of a universal joint 43. The other end of the telescoping shaft 42 has a universal joint 43' attached thereto by means of which the telescoping shaft is attached to a right angle worm gear unit 44 which in turn is attached to the shaft 28 on which sprocket wheels 26 and 27 are mounted. The telescoping shaft assembly thus provides for continuous uninterrupted driving of the pipe traction units irrespective of the position of each of the units with respect to the longitudinal centerline of the machine.

Figure 3:
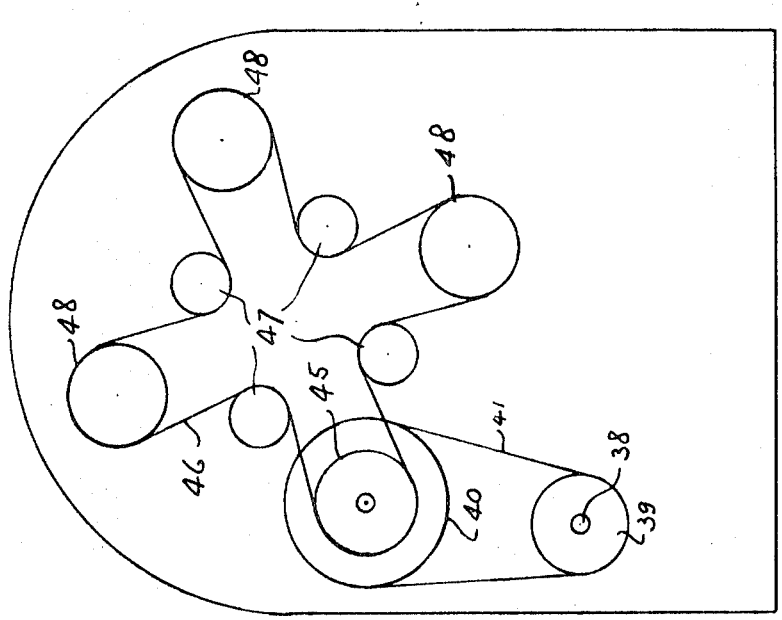
FIG. 3 is a diagrammatic view showing the drive arrangement for the machine of the present invention.

It will of course be appreciated that the drive assembly described above is duplicated for each of the four pipe traction units 18 through 21. This duplication is easily accomplished and understood with reference to FIG. 3 from which it will be observed that the sprocket chain drive assembly 39, 40, 41, also drives a sprocket wheel 45 which by means of a chain 46 and idler sprockets 47 supplies driving power to sprocket wheels 48. The sprocket wheels 48 are connected to the remaining three pipe traction units by means of telescoping shaft assemblies (not shown) in a manner previously described. It will thus be seen that with the drive arrangement as shown in FIG. 3 each of the pipe traction units 18 through 21 exerts identical pulling force to the pipe to be extracted from the sizing die.

As previously mentioned, each of the pipe traction units 18 through 21 is mounted for sliding movement on shafts 33 and may be moved along the shafts 33 by means of a chain and sprocket assembly 35. This mechanism is shown diagrammatically and in more detail in FIG. 4.

Referring now to FIG. 4, it will be observed that a chain 35 or 36 travels around outer chain sprockets 50, 51, 52 and 53 and around inner chain sprockets 54, 55, 56, and 57 between each of the four pairs of sprockets 50, 54; 51, 55; 52, 56; and 53, 57 there is an essentially straight stretch of chain 58, 59, 60 and 61 respectively. Each of the straight chain sections 58–61 contains a mounting block 62 which is attached to the slide blocks 32 of each of each of the wide extraction units 18 through 21. The chain 35 also travels around sprockets 63 and 64 between which is mounted a double-acting cylinder 65. The cylinder 65 has piston rods 66 and 67 to which the respective end portions of the chain 35 are suitably attached. Each of the straight chain sections between sprockets 52–63, 56–51, 55–50, 54–53 and 57–64 contains a turnbuckle (not shown) to make initial adjustments whereby pipe pulling elements 18–21 are centered and to compensate for uneven chain wear.

The cylinder 65 is attached to the frame member 11 and it will be noted that when the piston rods 66 and 67 are caused to move towards the right as seen in FIG. 4, the blocks 62 will move toward the pipe P by precisely the same amount. When the piston rods 66 and 67 move towards the left, the blocks 62 will move away from the pipe P. The chain mechanism as shown in FIG. 4 has been described in connection with the upright frame member 11 and the chain 35 shown in connection therewith. It will of course be appreciated that a similar mechanism is provided in connection with the upright frame member 10 and the chain 36 shown in connection therewith. In this manner both the front and the rear portions of the pipe extraction units 18 through 21 can be moved toward and away from the pipe individually or simultaneously as the case may be.

Figure 5:
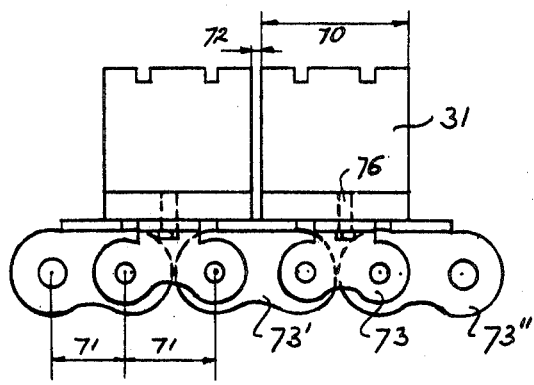
FIG. 5 is a front elevational view of an important part of the present invention.
Figure 7:
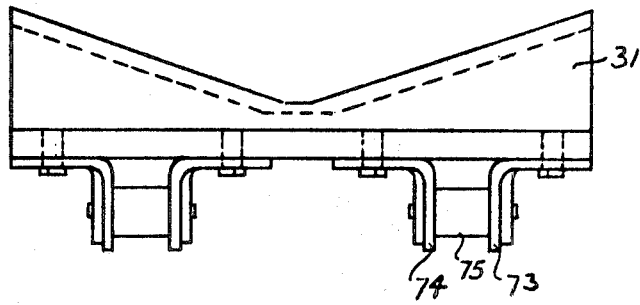
FIG. 7 is an elevational view of the structure shown in FIG. 6.
Figure 6:
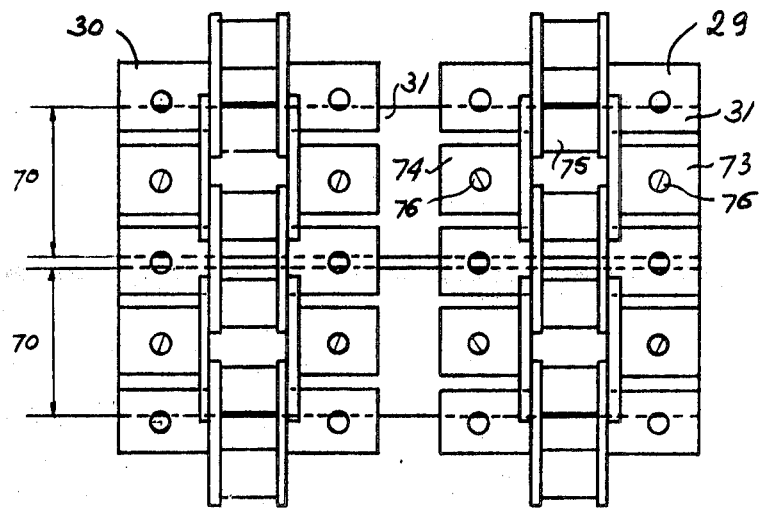
FIG. 6 is a plan view of the structure shown in FIG. 5.
Figure 8:
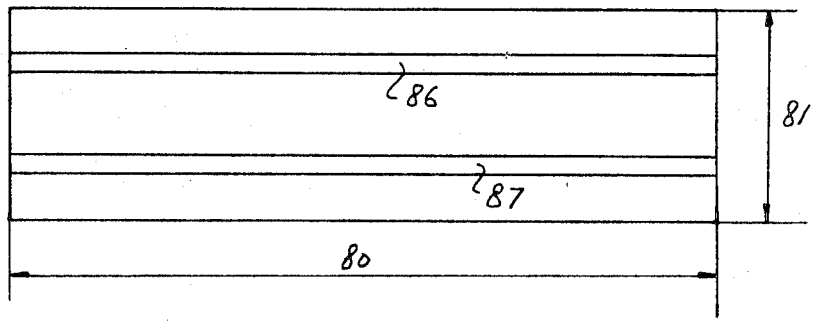
FIG. 8 is a plan view of the traction block which is a part of the present invention.

FIGS. 5, 6 and 7 show the manner in which the traction blocks 31 are mounted to each of the chains 29 and 30. Each of the traction blocks 31 has a width 70 extending in the direction of the chain. The width 70 is slightly less than two times the pitch 71 of the chains 29 and 30. The difference in dimension between the width 70 of the traction block 31 and twice the pitch 71 of the chains 29 and 30 provides for a clearance between the traction blocks 31. This clearance is indicated by the numeral 72. The clearance 72 is essential in order to permit the chains 29 and 30 with the traction blocks 31 mounted thereto to travel around the chain sprockets 26 and 27 of the pipe traction assemblies 18 through 21. Each of the chains 29 and 30 consist of a plurality of essentially L-shaped members 73 and 74 between which are mounted chain rollers 75 in a conventional manner. The traction blocks 31 are mounted to the L-shaped chain members 73 and 74 by means of screws 76. It should be noted that immediately following and preceding the L-shaped chain member to which the traction block 31 is attached is prefloating, that is, the traction blocks are only attached to alternate L-shaped chain members 73 and 74. This is best seen in FIG. 5 where it will be observed that traction block 31 is attached to chain member 73 by means of screws 76. The link 73' and the link 73'' is not attached to the traction block 31 so as to provide the necessary flexibility when the chains travel around the sprockets 26 and 27.

FIGS. 8, 9, 10 and 11 show the construction details of the individual traction blocks as utilized in the structure of the present invention.

Figures 9, 10:
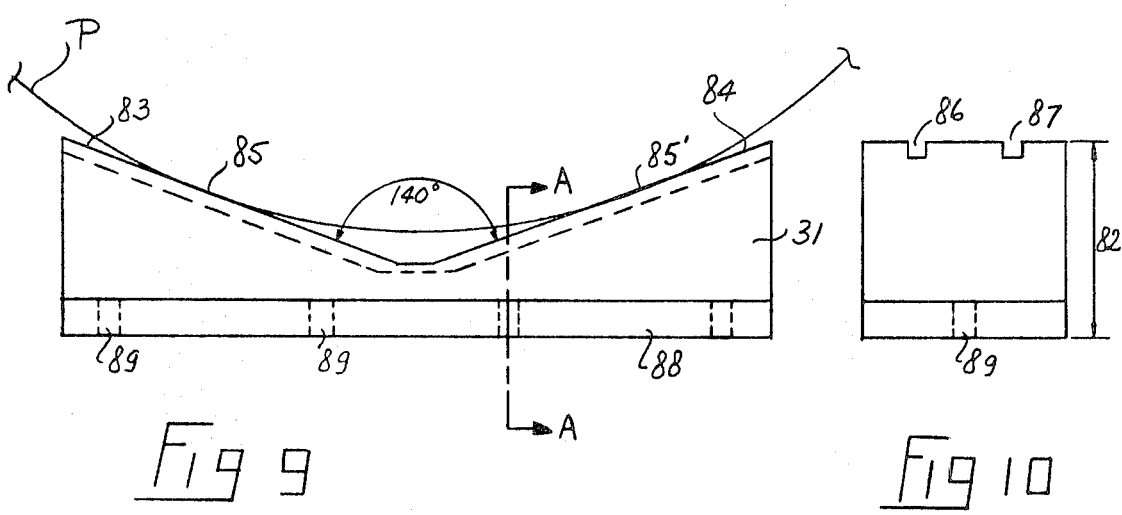
FIG. 9 is an elevational view of the structure shown in FIG. 8.
FIG. 10 is a front elevational view of the structure shown in FIG. 9.
Figure 11:
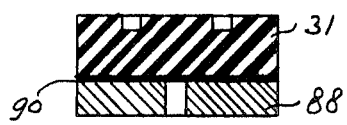
FIG. 11 is a cross-sectional view taken along lines A—A of FIG. 9.

Each of the traction blocks has a length 80, width 81, and a height 82. As shown in FIG. 9, the profile of the traction block is essentially V-shaped the included angle being approximately 140°. This included angle of 140° between pipe contact sides 83 and 84 is chosen so as to provide approximately equally spaced contact around the pipe periphery for a wide variety of pipe diameters. As will be seen in FIG. 9, the traction block 31 contacts the pipe P at tangent points 85 and 85'. Depending on the pipe diameter, the location of the tangent pipe will vary but with the optimum angle of 140° this variation is held to a minimum. In order to increase the traction exerted on the pipe P by the traction blocks 31 each of the blocks has been provided with two grooves 86 and 87 extending longitudinally of the traction blocks 31. Each of the traction blocks 31 is mounted to a mounting plate 88 each of which has four threaded holes 89 by means of which the traction block is mounted to the L-shaped portions of the chain as shown in FIGS. 5, 6 and 7. As shown in FIG. 11, the traction blocks are preferably molded from tire tread and vulcanized to the mounting plates 88. In order to obtain a strong bond between the traction block 31 and the mounting plate 88, the plate 88 has been provided with a multiplicity of fine grooves and ridges 90. The traction blocks 31 are simultaneously molded and vulcanized to the mounting bars 88, the grooves and ridges 90 insuring a proper bond between the metal mounting bars 88 and the rubber traction blocks 31.

FIG. 12 shows diagrammatically how four traction assemblies 18, 19, 20 and 21 may be spaced around the periphery of the pipe P thereby obtaining eight approximately equally spaced tangential compact points $a, b, c, d, e, f, g$, and $h$. It will of course be appreciated that the traction assemblies may be decreased to two where smaller pipes are involved and may be increased to as many as eight or more for larger pipe diameters while utilizing the same principles of the present invention.

The invention has been described in detail with reference to particular illustrative embodiments thereof, but it will be understood that variations and modifications can be effected within the spirit and scope of the invention as described heretofore and as defined in the appended claims.

I claim:
1. A mechanism for continuously pulling an elongate object through a processing machine comprising in combination;
a plurality of traction members spaced equidistant around the periphery of said object, each of said traction members comprising a pair of endless looped parallel chains mounted around a pair of sprocket wheels adapted to drivingly engage said chains, said chains having traction blocks mounted to the outer periphery thereof, said wheels being spaced apart in the axial direction of said object;

means associated with each of said traction members for simultaneously urging said traction members toward said object, and;

a telescoping drive shaft connected to at least one of said pair of sprocket wheels for driving said traction members in the direction of travel of said object whereby a pulling force is exerted on said object.

2. The structure of claim 1 wherein each of said traction blocks comprises a molded rubber generally V-shaped block.

3. The structure of claim 1 wherein the telescoping drive shaft of each of said traction members is driven by means of a common chain drive.

4. The structure of claim 1 wherein the ends of each of said traction members are slidably mounted on a shaft, said shaft extending in a radial direction with respect to said object, and means connected to each of said ends for moving said ends along said shaft.

5. The structure of claim 4 wherein said ends are mounted for pivotal movement with respect to said shaft.

6. The structure of claim 5 wherein the said means for moving said ends along said shaft comprises a chain guided over a plurality of sprockets, said chain having portions extending in the direction of travel of said ends along said shaft.

7. The structure of claim 5 wherein the ends of said chain are attached to a reversible motor means whereby said portions of said chain extending in the direction of travel of said end along said shaft may be simultaneously moved with respect to said object.